United States Patent
Liu et al.

(10) Patent No.: US 9,894,474 B2
(45) Date of Patent: Feb. 13, 2018

(54) ZIGBEE SYSTEM MANAGEMENT EMPLOYING A TR-069 ENABLED CPE PROXY

(71) Applicant: Alcatel Lucent, Boulogne-Billancourt (FR)

(72) Inventors: Gang Liu, Shanghai (CN); Timothy Carey, Corpus Christi, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/510,347

(22) PCT Filed: Sep. 18, 2014

(86) PCT No.: PCT/CN2014/086853
§ 371 (c)(1),
(2) Date: Mar. 10, 2017

(87) PCT Pub. No.: WO2016/041177
PCT Pub. Date: Mar. 24, 2016

(65) Prior Publication Data
US 2017/0289745 A1 Oct. 5, 2017

(51) Int. Cl.
*H04B 7/00* (2006.01)
*H04W 4/00* (2009.01)
(Continued)

(52) U.S. Cl.
CPC ......... *H04W 4/008* (2013.01); *H04L 41/0803* (2013.01); *H04W 84/18* (2013.01)

(58) Field of Classification Search
CPC ............................ H04L 41/0803; H04W 4/008
(Continued)

(56) References Cited

U.S. PATENT DOCUMENTS 9,167,515 B2 * 10/2015 Singh ................ H04W 52/0216
2013/0163491 A1 * 6/2013 Singh ................ H04W 52/0216
370/311

FOREIGN PATENT DOCUMENTS

| CN | 102148731 A | 8/2011 |
| CN | 102393701 A | 3/2012 |
| CN | 103987057 A | 8/2014 |

OTHER PUBLICATIONS

International Search Report PCT/ISA/210 for International Application No. PCT/CN2014/086853 dated Jun. 3, 2015.

* cited by examiner

*Primary Examiner* — Ayodeji Ayotunde
(74) *Attorney, Agent, or Firm* — Harness, Dickey & Pierce, P.L.C.

(57) ABSTRACT

A ZigBee management system includes an auto configuration server (ACS) that manages customer premises equipment (CPE) through CWMP messaging and a CPE proxy that is coupled to the ACS to provide a protocol translation between the CWMP messaging and ZigBee device object (ZDO) messaging for a ZigBee device. The ZigBee management system also includes a hybrid ZigBee coordinator that is coupled to the CPE proxy and has a ZigBee protocol stack having a ZigBee MAC layer as an initial layer, a non-ZigBee physical layer that is coupled to the ZigBee protocol stack and communicates the ZDO messaging over a non-standard ZigBee interface with the CPE proxy, and a ZigBee physical layer that is coupled to the ZigBee protocol stack and the non-ZigBee physical layer and transceives the ZDO messaging for the ZigBee device over a standard ZigBee interface. A method of managing a ZigBee network is also provided.

20 Claims, 10 Drawing Sheets

(51) Int. Cl.
*H04L 12/24* (2006.01)
*H04W 84/18* (2009.01)

(58) Field of Classification Search
USPC .............................................. 455/41.1, 41.2
See application file for complete search history.

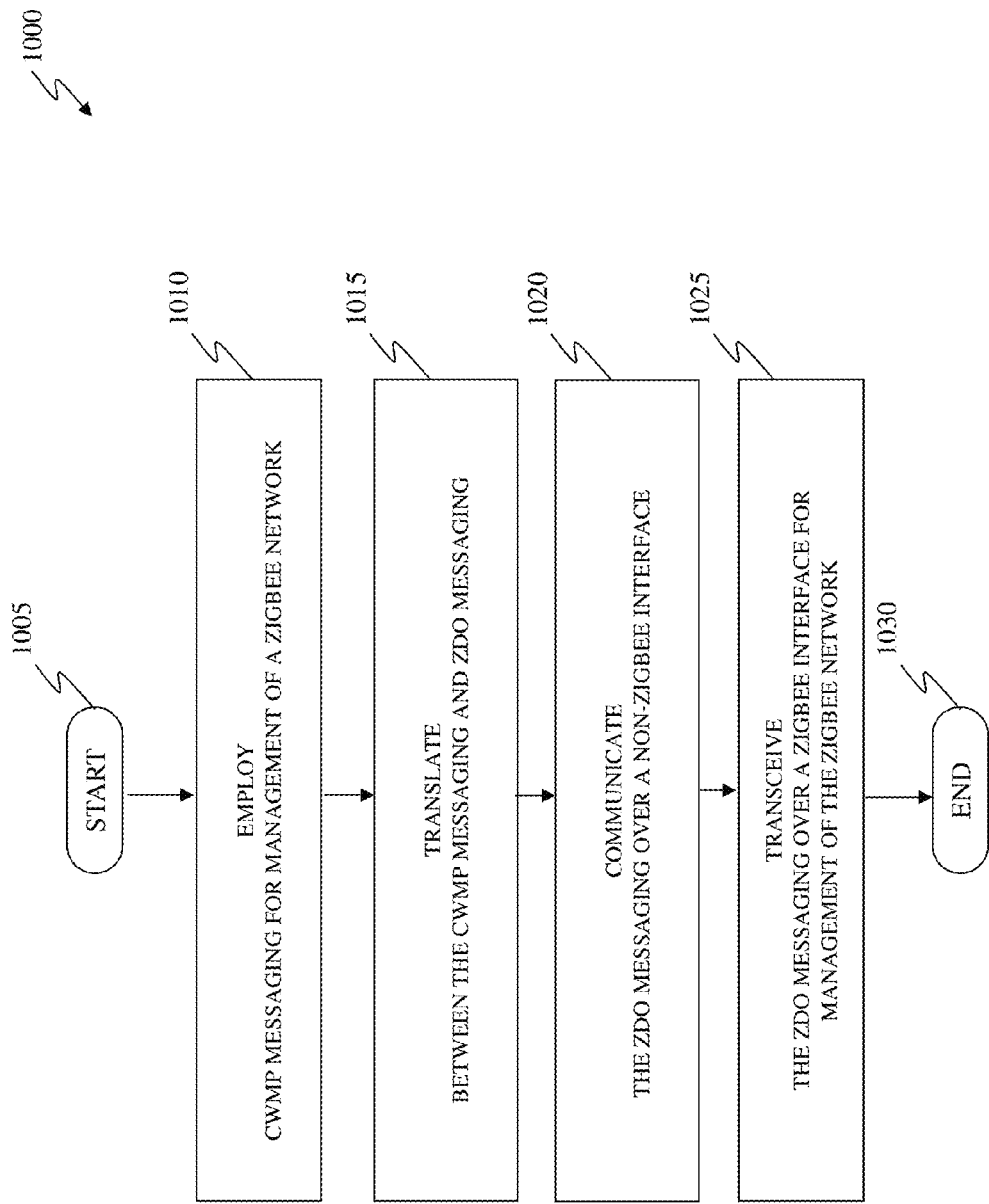

ZIGBEE SYSTEM MANAGEMENT EMPLOYING A TR-069 ENABLED CPE PROXY

CROSS-REFERENCE TO RELATED APPLICATIONS

This application is the U.S. National Phase application of PCT Application No. PCT/CN2014/086853 filed on Sep. 18, 2014 the entire contents of which is incorporated herein by reference.

TECHNICAL FIELD

This application is directed, in general, to communications and, more specifically, to a hybrid ZigBee coordinator, a method of managing a ZigBee network and a ZigBee management system.

BACKGROUND

The development of ZigBee devices and networks has been driven from a realization that Wi-Fi and Bluetooth applications were unsuitable for many applications. ZigBee devices are typically used to create personal area networks (PANs) that employ low-power digital radios for communication (located in a ZigBee protocol physical layer), and these PANs may also be ad hoc in nature. ZigBee networks may include ZigBee devices that function as gateways, coordinators, routers and end devices that all employ this digital radio communication. Additionally, ZigBee networks may be decentralized in nature (e.g., a mesh network arrangement) and communicate over longer distances by passing data through near or existing ZigBee devices and networks to reach more distant ones. Improvements that allow ZigBee devices to interact more broadly would be beneficial to the art.

SUMMARY

In one aspect, the present disclosure provides a hybrid ZigBee coordinator. In one embodiment, the hybrid ZigBee coordinator includes a ZigBee protocol stack having a ZigBee MAC layer as an initial layer. Additionally, the hybrid ZigBee coordinator includes a non-ZigBee physical layer coupled to the ZigBee protocol stack and configured to communicate ZDO messaging for a ZigBee device over a non-standard ZigBee interface. The hybrid ZigBee coordinator also includes a ZigBee physical layer coupled to the ZigBee protocol stack and the non-ZigBee physical layer and configured to transceive the ZDO messaging for the ZigBee device over a standard ZigBee interface.

In another aspect, the present disclosure provides a method of managing a ZigBee network. In one embodiment, the method of managing the ZigBee network includes employing customer premises equipment (CPE) wide area network (WAN) management protocol (CWMP) messaging for management of a ZigBee network and translating between the CWMP messaging and ZigBee Device Object (ZDO) messaging. The method also includes communicating the ZDO messaging over a non-ZigBee interface and transceiving the ZDO messaging over a ZigBee interface for management of the ZigBee network.

In yet another aspect, the present disclosure provides a ZigBee management system. In one embodiment, the ZigBee management system includes an auto configuration server (ACS) that manages customer premises equipment (CPE) through CPE wide area network (WAN) management protocol (CWMP) messaging. The ZigBee management system also includes a CPE proxy that is coupled to the ACS to provide a protocol translation between the CWMP messaging and ZigBee device object (ZDO) messaging for a ZigBee device. The ZigBee management system further includes a hybrid ZigBee coordinator that is coupled to the CPE proxy and has a ZigBee protocol stack having a ZigBee MAC layer as an initial layer. The hybrid ZigBee coordinator also has a non-ZigBee physical layer that is coupled to the ZigBee protocol stack and communicates the ZDO messaging over a non-standard ZigBee interface with the CPE proxy. The hybrid ZigBee coordinator further has a ZigBee physical layer that is coupled to the ZigBee protocol stack and the non-ZigBee physical layer and transceives the ZDO messaging for the ZigBee device over a standard ZigBee interface.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conceptions and specific embodiments as a basis for designing or modifying other structures for carrying out the same purposes of the present disclosure.

BRIEF DESCRIPTION

Reference is now made to the following descriptions taken in conjunction with the accompanying drawings, in which:

FIG. 10 illustrates a flow diagram of an embodiment of a method of managing a ZigBee network carried out according to the principles of the present disclosure.

DETAILED DESCRIPTION

Embodiments of the present disclosure provide management of a ZigBee network by a TR069-enabled customer premises equipment (CPE) proxy that additionally coupled to a TR069-enabled auto-configuration server (ACS). In a typical scenario, the CPE proxy may be included in a broadband router, such as a home gateway or an enterprise (business) gateway, which is typically not equipped with a standard ZigBee interface having a ZigBee physical layer. Therefore, a standard ZigBee gateway solution is not applicable for the CPE proxy. In contrast to a static configuration solution, embodiments of the present disclosure support automatic discovery and management of the ZigBee network without having to employ standard ZigBee radio interface requirements for the CPE proxy. These embodiments perform as a logical ZigBee interface.

In addition to automatic discovery of the ZigBee network, control and forwarding operations between the CPE proxy and the ZigBee network are enabled, and no extra command and signaling are required for the ZigBee network to react to ZigBee network management requests (e.g., a discovery request) from the CPE proxy. Further extensions provide for additional control and forwarding between the CPE proxy and the ZigBee network.

Figure 1:
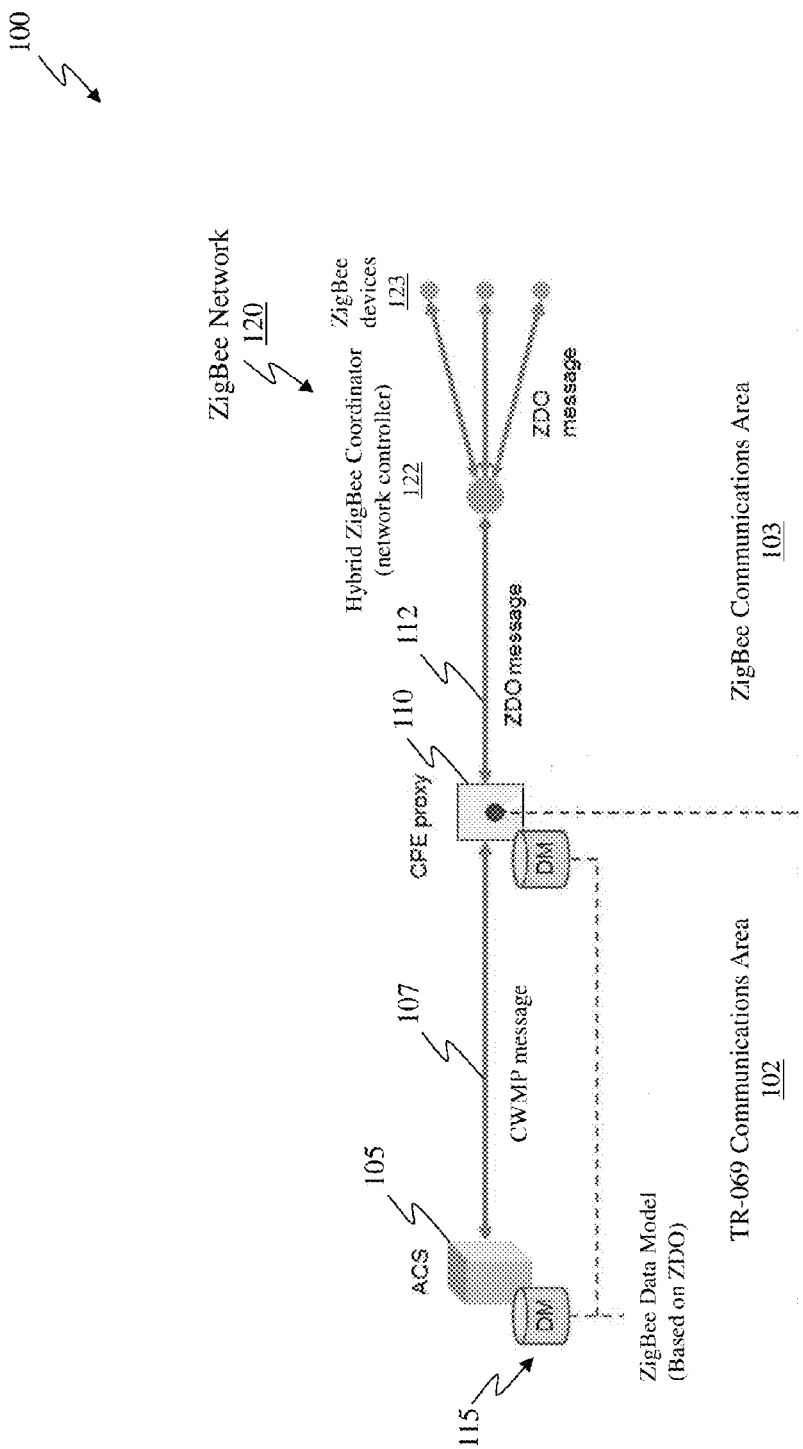
FIG. 1 illustrates a diagram of an embodiment of a ZigBee management system constructed according to the principles of the present disclosure.

FIG. 1 illustrates a diagram of an embodiment of a ZigBee management system, generally designated 100, constructed according to the principles of the present disclosure. The ZigBee management system 100 is divided into a Technical Report 069 (TR-069) communications area 102 and a ZigBee communications area 103. The ZigBee management system 100 includes an auto configuration server (ACS) 105, a customer premises equipment (CPE) proxy 110, a ZigBee data model 115, and a ZigBee network 120. In the illustrated embodiment, the ZigBee network 120 includes a hybrid ZigBee coordinator 122 and a plurality of ZigBee devices 123.

Generally, the TR-069 specifies a standard communications mechanism between an ACS and a CPE, wherein the ACS is generally a component in a broadband network that is responsible for auto configuration of the CPE for advanced services. In the TR-069 communications area 102, CPE wide area network (WAN) management protocol (CWMP) messages are provided between the ACS 105 and the CPE proxy 110 employing a wide area network (WAN) interface 107 wherein these CWMP messages are based on the ZigBee data model 115. In this disclosure, the ACS 105 manages or interrelates with the CPE proxy 110 through these CWMP mechanisms and is not aware of any proxy protocol messaging (i.e., ZigBee Device Object (ZDO) messaging) that may be utilized to initiate or complete ZigBee network actions.

In the ZigBee communications area 103, ZDO messages are provided between the CPE proxy 110 and the ZigBee network 120 employing a non-standard ZigBee interface 112 that is associated with a non-ZigBee physical layer. The CPE proxy 110 may normally reside in a device such as a broadband router (e.g., a home or enterprise gateway) and acts as a translation path or bridge between the TR-069 communications area 102 and the ZigBee communications area 103. Here, protocol translations occur between CWMP messaging and ZDO messaging to provide communications between the ASC 105 and the ZigBee network 120 that are based on the ZigBee data model 115.

Generally, a data model is a hierarchical set of objects, parameters or attributes that define a representation of a device in a protocol neutral format. The ZigBee data model 115 is based on the TR-069 standard and provides representations of ZigBee devices wherein specific components are represented in order to transform a ZigBee device into protocol neutral pieces of functionality. For example, these objects may include basic device information, time-of-day configuration, network interface and protocol stack configuration, routing and bridging management, throughput statistics, and diagnostic tests.

In a standard ZigBee interface, communication is accomplished employing a radio-based physical layer that transmits and receives ZDO messaging between members of a ZigBee network. As noted above, the non-standard ZigBee interface 112 is coupled to a non-ZigBee physical layer to provide ZDO messaging between the CPE proxy 110 and the ZigBee network 120. In one embodiment of the ZigBee management system 100, the non-standard ZigBee interface 112 employs a wireline connection (e.g., a wireline network) between the CPE proxy 110 and the ZigBee system 120. Examples of this wireline connection include a USB (Universal Serial Bus) structure, an Ethernet structure, an RS232 structure or a PLC (Power Line Communication) structure. Of course, other current or future wireline structures that provide ZDO messaging encapsulation may also be employed.

In other embodiments, the non-standard ZigBee interface 112 may employ a non-ZigBee wireless connection. (e.g., a non-ZigBee wireless network) between the CPE proxy 110 and the ZigBee system 120. Examples this non-ZigBee wireless connection include Wi-Fi connections, Third Generation (3G) mobile network connections, Fourth Generation (4G) mobile network connections or other similar current or future non-ZigBee wireless structures that can provide a ZDO messaging encapsulation capability.

The ZigBee network 120 is shown generally in FIG. 1 and includes the hybrid ZigBee coordinator 122 and the plurality of ZigBee devices 123, as noted earlier. Of course, only a single ZigBee device may be included in the ZigBee network 120, for some embodiments. The hybrid ZigBee coordinator 122 includes a ZigBee protocol stack having a ZigBee MAC layer as an initial layer. The hybrid ZigBee coordinator 122 also includes a non-ZigBee physical layer, coupled to the ZigBee protocol stack, that is configured to communicate ZDO messaging for the ZigBee devices 123 over a non-standard ZigBee interface. The hybrid ZigBee coordinator 122 additionally includes a ZigBee physical layer, coupled to the ZigBee protocol stack and the non-ZigBee physical layer, that is configured to transceive the ZDO messaging for the ZigBee devices 123 over a standard ZigBee interface. The ZigBee devices 123 may include one or more ZigBee end devices, ZigBee routers or standard ZigBee coordinators that are organized into a ZigBee star network, a ZigBee mesh network or a ZigBee tree network.

Figure 2:
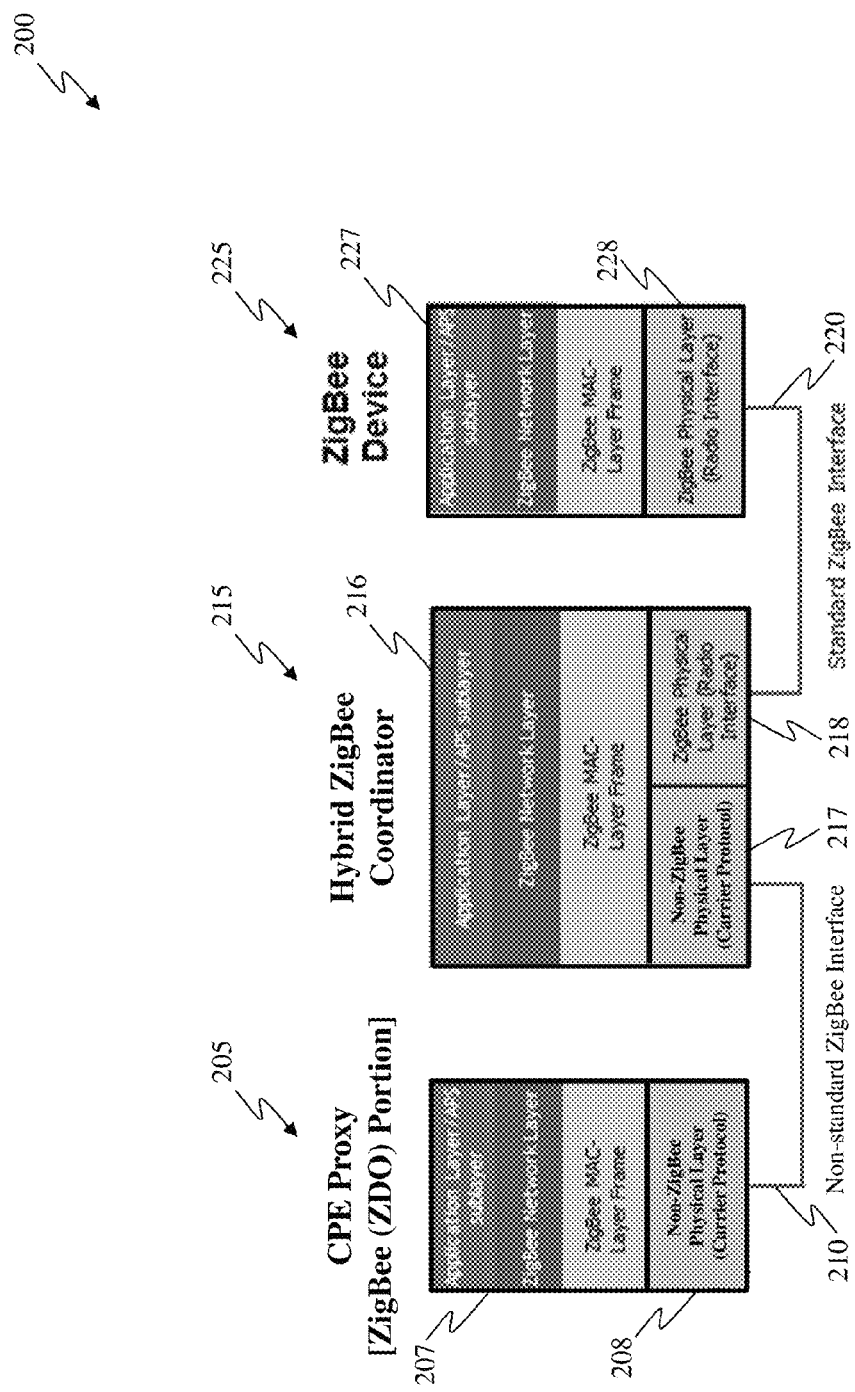
FIG. 2 illustrates a diagram of an embodiment of a ZigBee communications area constructed according to the principles of the present disclosure.

FIG. 2 illustrates a diagram of an embodiment of a ZigBee communications area, generally designated 200, constructed according the principles of the present disclosure. The ZigBee communications area 200 includes protocol representations for a ZigBee (ZDO) portion of a CPE proxy 205, a hybrid ZigBee coordinator 215 and a ZigBee device 225. The ZigBee communications area 200 also includes a non-standard ZigBee Interface 210 coupled between the CPE proxy 205 and the hybrid ZigBee coordinator 215, as well as, a standard ZigBee interface 220 coupled between the hybrid ZigBee coordinator 215 and the ZigBee device 225.

The CPE proxy 205 includes a ZigBee protocol stack 207 and a non-ZigBee physical layer 208 that is coupled between the ZigBee protocol stack 207 and the non-standard ZigBee Interface 210. The hybrid ZigBee coordinator 215 also includes a ZigBee protocol stack 216 that is coupled to a non-ZigBee physical layer 217 and a ZigBee physical layer 218, as shown. The non-ZigBee physical layer 217 is coupled to the non-standard ZigBee Interface 210, and the ZigBee physical layer 218 is coupled to the standard ZigBee interface 220.

The ZigBee device 225 also includes a ZigBee protocol stack 227 and a ZigBee physical layer 228 that is coupled between the ZigBee protocol stack 227 and the standard ZigBee Interface 220. The Non-ZigBee physical layers 208, 217 employ a carrier protocol dictated by the non-standard ZigBee interface 210. The ZigBee physical layers 218, 228 employ a radio interface protocol as dictated by the standard ZigBee interface 220. The ZigBee protocol stacks 207, 216, 227 employ ZigBee MAC layers, ZigBee network layers and application layers/APS sub-layers that are standard ZigBee protocol layers.

Figure 3:
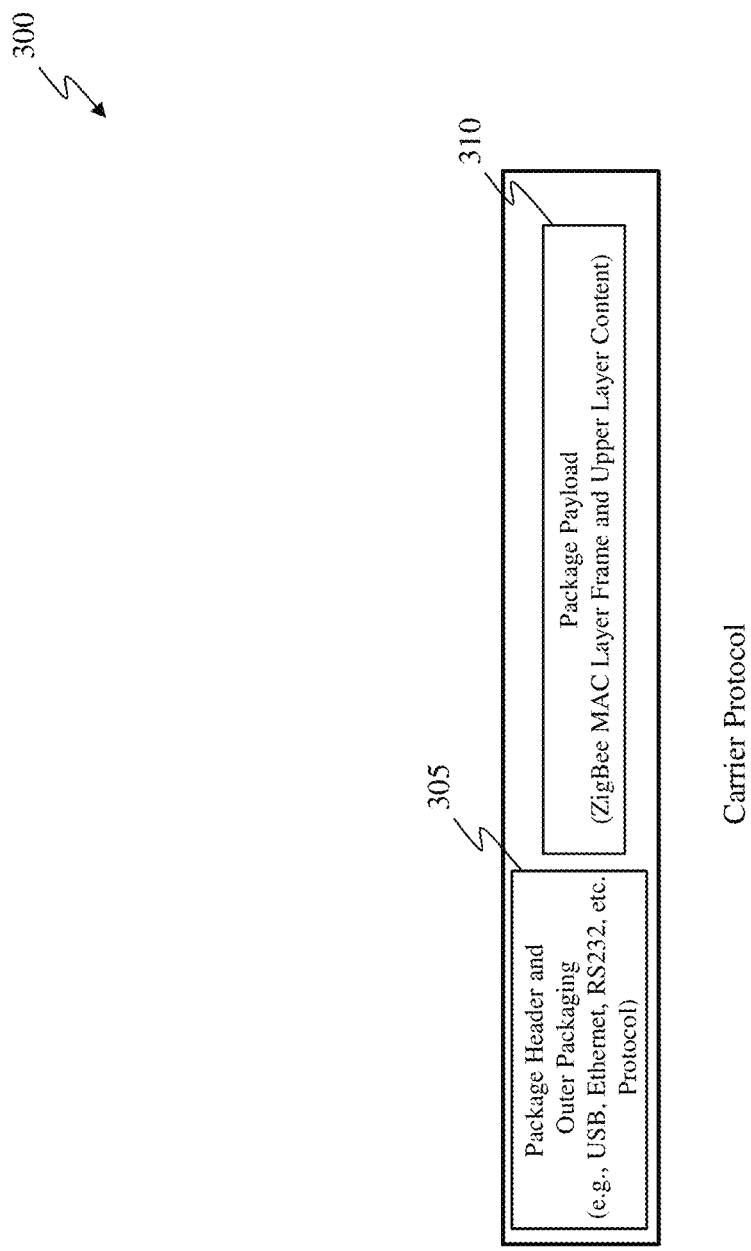
FIG. 3 illustrates a diagram of an example of a carrier protocol employing encapsulation of ZDO messaging as may be employed for non-standard ZigBee interfaces.

FIG. 3 illustrates a diagram of an example of a carrier protocol employing encapsulation of ZDO messaging, generally designated 300, as may be employed for non-standard ZigBee interfaces such as the non-standard ZigBee interfaces 112 and 210 of the ZigBee management system 100 and the ZigBee communications area 200 of FIGS. 1 and 2, respectively. Here, the non-standard ZigBee interface is indicated to be a wireline connection. Of course, a non-ZigBee wireless connection may also be employed.

The carrier encapsulation example 300 includes package header and outer packaging information 305 and package payload information 310. The package header and outer packaging information 305 is generally particular to the carrier protocol required by the non-standard ZigBee interface employed. The package payload information 310 is provided by a ZigBee MAC layer frame and upper layer content as was indicated in the ZigBee protocol stacks of FIG. 2.

When an ACS employing a CPE proxy wants to discover a hybrid ZigBee coordinator, the CPE proxy can employ a Discover request and response sequence that is already defined in an associated ZigBee MAC layer frame of the CPE proxy to accomplish the discovery relationship.

Figure 4:
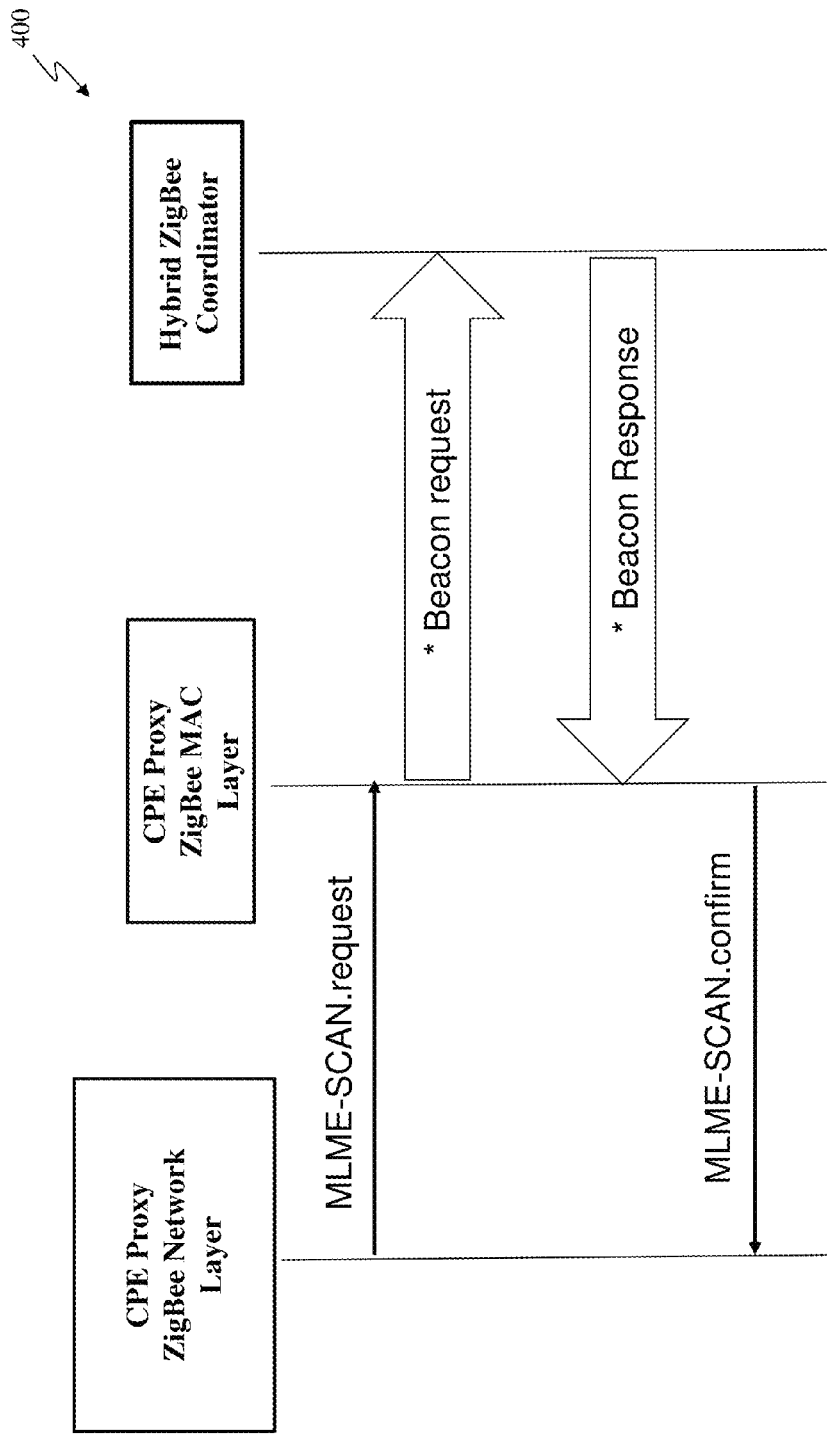
FIG. 4 illustrates a diagram of an example of a ZDO messaging sequence for discovery of a hybrid ZigBee coordinator as may be employed in a ZigBee management system.

FIG. 4 illustrates a diagram of an example of a ZDO messaging sequence for discovery of a hybrid ZigBee coordinator, generally designated 400, as may be employed in a ZigBee management system such as that of FIG. 1. An ACS may initiate the discovery process employing an associated CPE proxy (e.g., the ACS 105 employing the CPE proxy 110). The discovery messaging sequence 400 is communicated over a non-standard ZigBee interface between the CPE proxy and the hybrid ZigBee coordinator.

The discovery ZDO messaging sequence 400 is initiated in a CPE proxy ZigBee network layer for a ZigBee MAC layer of the CPE proxy by a MLME-SCAN.request (MAC Layer Management Entity SCAN request), as shown. The CPE proxy MAC layer then issues a Beacon request that is encapsulated by a Non-ZigBee physical layer of the CPE proxy into a carrier protocol dictated by the non-standard ZigBee interface connecting the CPE proxy and the hybrid ZigBee coordinator. The encapsulated Beacon request is sent over the non-standard ZigBee interface to a Non-ZigBee physical layer of the hybrid ZigBee coordinator. This request is decapsulated and processed by the hybrid ZigBee coordinator, which then responds with an encapsulated Beacon response to the CPE proxy over the non-standard ZigBee interface. The encapsulated Beacon frame is decapsulated by the CPE proxy non-ZigBee physical layer and provided to the CPE proxy MAC layer, which issues a MLME-SCAN.confirm (MAC Layer Management Entity SCAN confirm) to the CPE proxy ZigBee network layer for completion of the discovery ZDO messaging sequence 400.

When a CPE proxy has discovered a hybrid ZigBee coordinator and wants to associate with it, the CPE proxy can employ an Association request and respond command, which is already defined in a CPE proxy ZigBee MAC layer to accomplish the association relationship.

Figure 5:
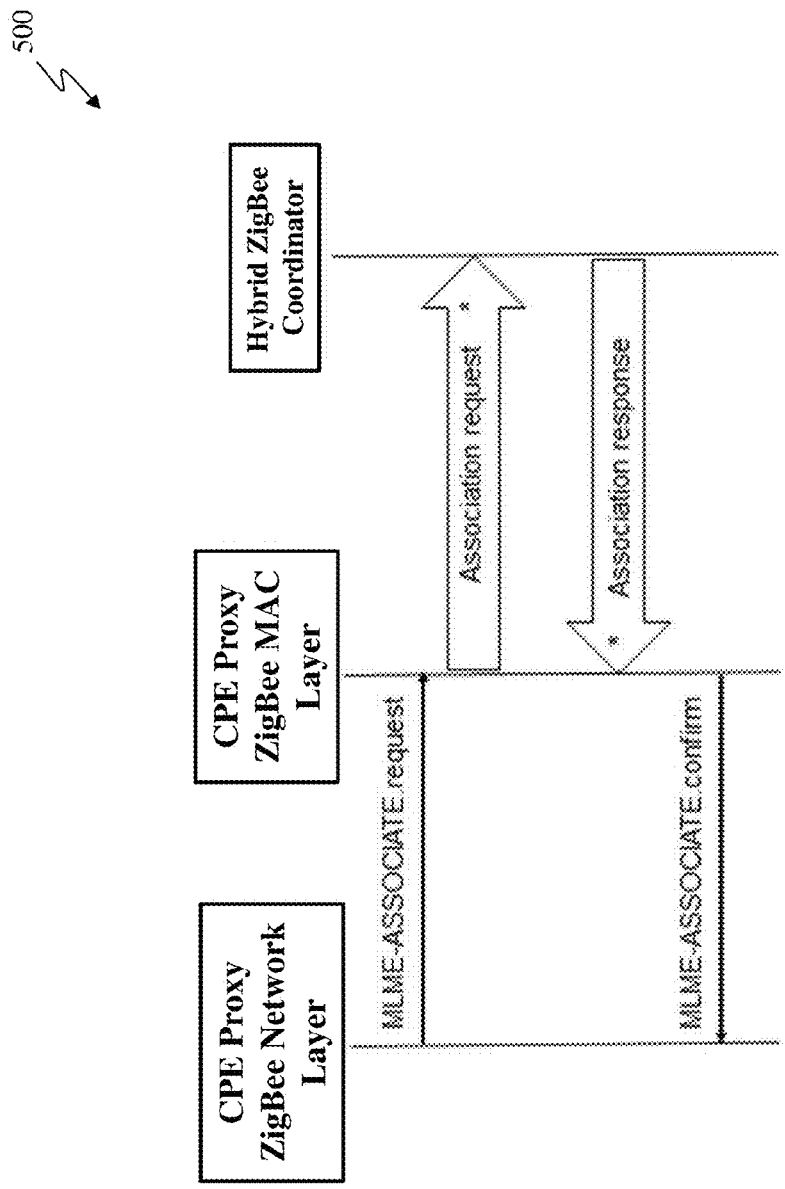
FIG. 5 illustrates a diagram of an example of a ZDO messaging sequence association with a hybrid ZigBee coordinator as may be employed in a ZigBee management system.

FIG. 5 illustrates a diagram of an example of a ZDO messaging sequence for association with a hybrid ZigBee coordinator, generally designated 500, as may be employed in a ZigBee management system such as that of FIG. 1. The association messaging sequence 500 is communicated over a non-standard ZigBee interface between a CPE proxy and the hybrid ZigBee coordinator.

The association ZDO messaging sequence 500 is initiated in a CPE proxy ZigBee network layer for a ZigBee MAC layer of the CPE proxy by a MLME-ASSOCIATE.request (MAC Layer Management Entity ASSOCIATE request), as shown. The CPE proxy MAC layer then issues an association request that is encapsulated by a non-ZigBee physical layer of the CPE proxy into a carrier protocol dictated by the non-standard ZigBee interface connecting the CPE proxy and the hybrid ZigBee coordinator. The encapsulated Association request is sent over the non-standard ZigBee interface to a Non-ZigBee physical layer of the hybrid ZigBee coordinator. This request is decapsulated and processed by the hybrid ZigBee coordinator, which then responds with an encapsulated Association response to the CPE proxy over the non-standard ZigBee interface. The encapsulated Association response is decapsulated by the non-ZigBee physical layer of the CPE proxy and provided to the CPE proxy MAC layer, which issues a MLME-ASSOCIATE.confirm (MAC Layer Management Entity ASSOCIATE confirm) to the CPE proxy ZigBee network layer for completion of the association ZDO messaging sequence 500.

Figure 6:
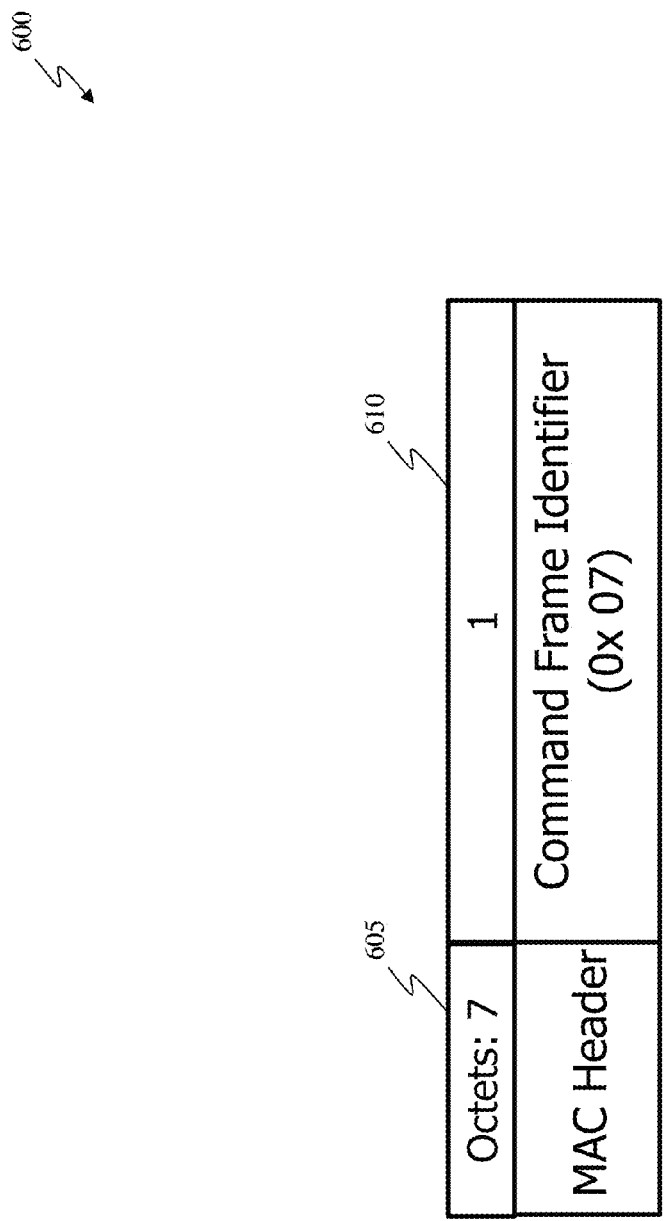
FIG. 6 illustrates an example of a Beacon request command format as may be employed in a ZigBee management system.

FIG. 6 illustrates an example of a Beacon request command format, generally designated 600, as may be employed in a ZigBee management system such as that of FIG. 1. The Beacon request command format 600 may be employed by a CPE proxy to locate all hybrid ZigBee coordinators that are connected to its non-standard ZigBee interface, during an active scan. Additionally, the Beacon request command format 600 may be used by the hybrid ZigBee coordinator to locate all traditional ZigBee coordinators that are within radio communications range of its standard ZigBee interface, during an active scan.

The Beacon request command format 600 includes a MAC header 605 and a command frame Identifier 610. The MAC header 605 may be a ZigBee protocol standard MAC header and is seven bytes in length. The field of the command frame Identifier 610 is set as 0x07 (i.e., one byte in length), which indicates that this MAC frame corresponds to a Beacon request command.

Figure 7:
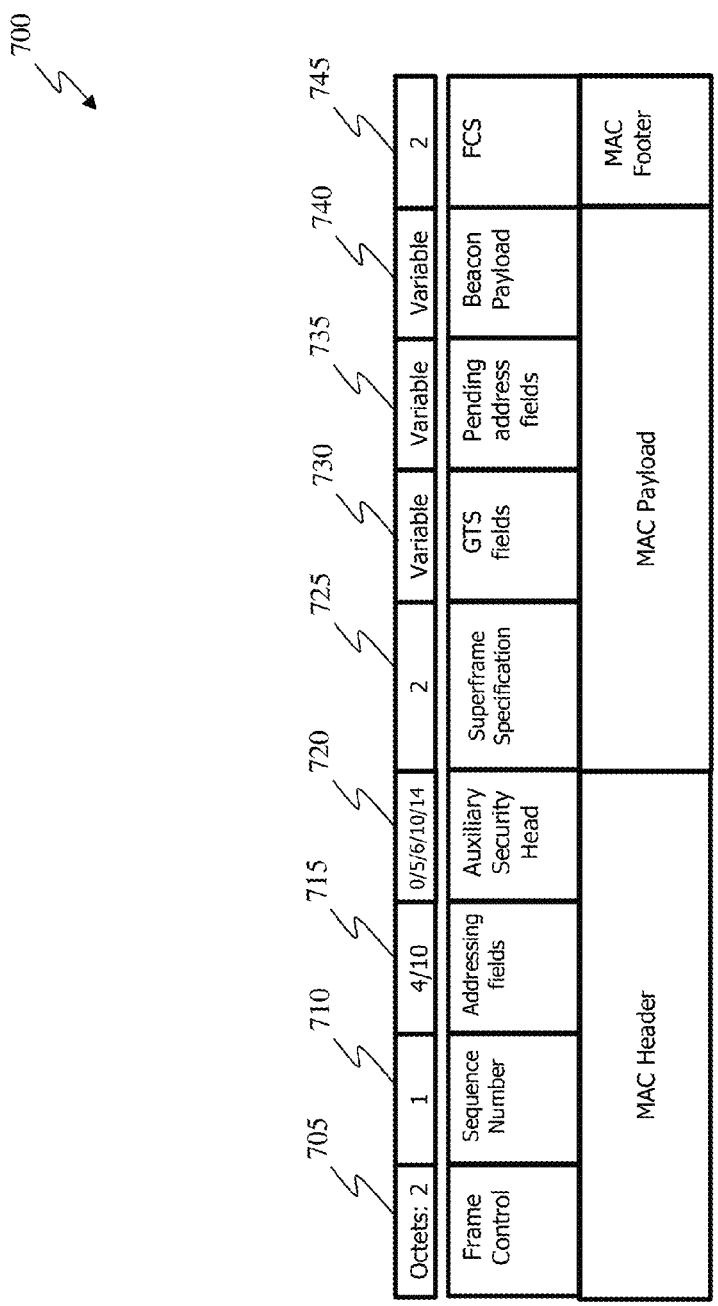
FIG. 7 illustrates an example of a Beacon frame format as may be employed in a ZigBee management system.

FIG. 7 illustrates an example of a Beacon frame format, generally designated 700, as may be employed in a ZigBee management system such as that of FIG. 1. The Beacon frame format 700 includes a MAC header having a frame control field 705, a sequence number field 710, addressing fields 715, and an auxiliary security head field 720. The Beacon frame format 700 also includes a MAC payload having a Superframe specification field 725, guaranteed time slots (GTS) fields 730, pending address fields 735 and a Beacon payload field 740. The Beacon frame format 700 additionally includes a MAC footer having a frame check sequence (FCS) field 745.

In the MAC header, The Frame Control field 705 contains a value that indicates a beacon frame. The Sequence Number field 710 indicates a Beacon sequence. The Addressing fields 715 contain only the source address fields, as shown in FIG.

8 below. The Auxiliary Security Head field 720 is an optional field that specifies information required for security processing.

Figure 9:
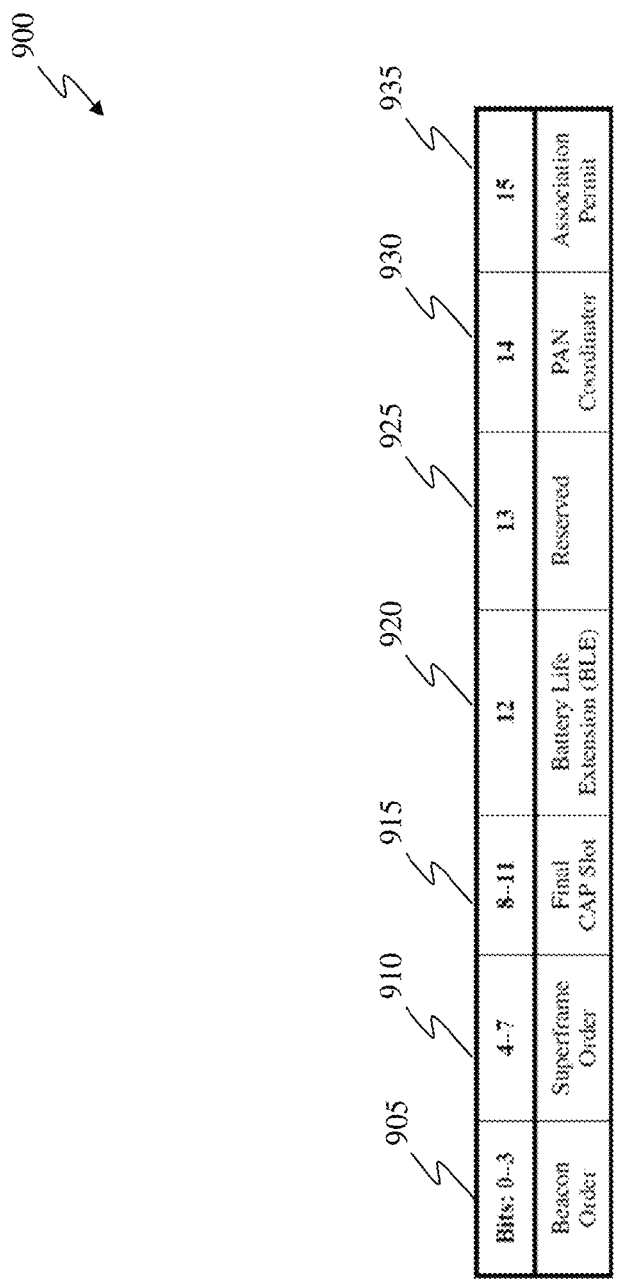
FIG. 9 illustrates an example of a Superframe specification field format as may be employed in a ZigBee management system.

In the MAC payload, the Superframe Specification field 725 is formatted as illustrated in FIG. 9. In the Superframe Specification field 725, the PAN Coordinator sub-field is set to one if the beacon frame is being transmitted by the PAN coordinator. Otherwise, the PAN Coordinator sub-field is set to zero. From this sub-field, it can be determined if the ZigBee device is a hybrid or standard ZigBee coordinator.

The GTS fields 730 indicate values for the guaranteed time slots. The pending address fields 735 list all pending addresses. These include addresses of devices that currently have messages pending with the associated hybrid or standard ZigBee coordinator. The Beacon payload field 740 is an optional sequence specified to be transmitted in a Beacon frame by a next higher protocol layer. The Beacon Payload field 740 is an optional sequence of up to aMaxBeaconPayloadLength. Further information may be extended to this field which could fulfill specific discovery, control or forwarding requirements between a CPE proxy and a hybrid ZigBee coordinator. This may also be employed for future development.

Figure 8:
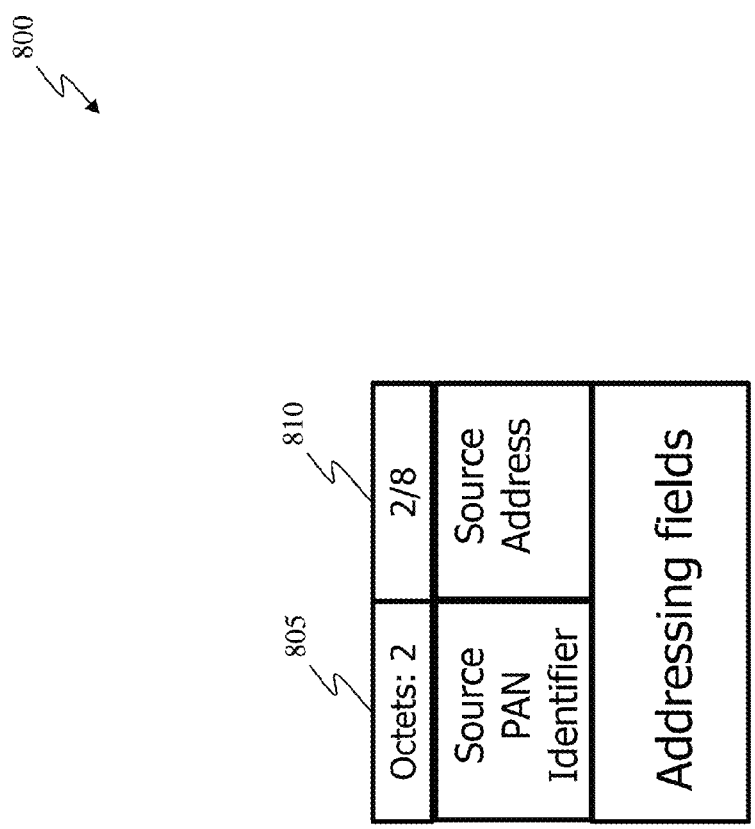
FIG. 8 illustrates an example of ZigBee MAC header addressing fields as may be employed in a ZigBee management system.

FIG. 8 illustrates an example of ZigBee MAC header addressing fields, generally designated 800, as may be employed in a ZigBee management system such as that of FIG. 1. The MAC header addressing fields 800 include a source PAN (personal area network) identifier 805 and source addresses 810. Here, the source PAN identifier and source address fields contain the PAN identifier and address, respectively, of the device transmitting the beacon.

FIG. 9 illustrates an example of a Superframe specification field format, generally designated 900, as may be employed in a ZigBee management system such as that of FIG. 1. The Superframe specification field 900 includes a beacon order subfield 905, a Superframe order subfield 910, a final CAP slot subfield 915, a battery life extension subfield 920, a reserved subfield 925, a pan coordinator subfield 930 and an association permit subfield 935. The PAN Coordinator subfield 930 is set to one if the beacon frame is being transmitted by the PAN coordinator. Otherwise, the PAN Coordinator subfield 930 is set to zero.

FIG. 10 illustrates a flow diagram of an embodiment of a method of managing a ZigBee network, generally designated 1000, carried out according to the principles of the present disclosure. The method 1000 starts in a step 1005 and customer premises equipment (CPE) wide area network (WAN) management protocol (CWMP) messaging is employed for management of a ZigBee network, in a step 1010. Then, the CWMP messaging and ZigBee Device Object (ZDO) messaging are translated, in a step 1015. The ZDO messaging is communicated over a non-ZigBee interface, in a step 1020. The ZDO messaging is transceived over a ZigBee interface for management of the ZigBee network, in a step 1025.

In one embodiment, employing the CWMP messaging includes sending and receiving the CWMP messaging between an auto configuration server (ACS) and a CPE proxy. In another embodiment, translating between the CWMP messaging and the ZDO messaging includes providing the translation in a CPE proxy and basing the translation on a ZigBee data model.

In yet another embodiment, communicating the ZDO messaging includes selecting the non-ZigBee interface from the wireline group consisting of a USB structure, an Ethernet structure, an RS232 structure and a Power Line Communication structure. In still another embodiment, communicating the ZDO messaging includes selecting the non-ZigBee interface from the wireless group consisting of a Wi-Fi network, a Third Generation (3G) mobile network and a Fourth Generation (4G) mobile network.

In a further embodiment, communicating the ZDO messaging includes employing a non-ZigBee physical layer in a hybrid ZigBee coordinator. In a yet further embodiment, transceiving the ZDO messaging includes employing a ZigBee physical layer in a hybrid ZigBee coordinator. The method 1000 ends in a step 1030.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A hybrid ZigBee coordinator, comprising:
   a ZigBee protocol stack having a ZigBee MAC layer as an initial layer;
   a non-ZigBee physical layer coupled to the ZigBee protocol stack and configured to communicate ZDO messaging for a ZigBee device over a non-standard ZigBee interface; and
   a ZigBee physical layer coupled to the ZigBee protocol stack and the non-ZigBee physical layer and configured to transceive the ZDO messaging for the ZigBee device over a standard ZigBee interface.

2. The coordinator as recited in claim 1 wherein the non-standard ZigBee interface is coupled to a customer premises equipment (CPE) proxy that provides protocol translation between the ZDO messaging and CPE wide area network (WAN) management protocol (CWMP) messaging employed by an auto configuration server.

3. The coordinator as recited in claim 1 wherein the ZDO messaging is based on a ZigBee data model and encapsulated in a wireline carrier or a non-ZigBee wireless carrier of the non-standard ZigBee interface.

4. The coordinator as recited in claim 1 wherein the non-standard ZigBee interface includes a wireline connection selected from the group consisting of:
   a USB structure;
   an Ethernet structure;
   an RS232 structure; and
   a Power Line Communication structure.

5. The coordinator as recited in claim 1 wherein the non-standard ZigBee interface includes a non-ZigBee wireless connection selected from the group consisting of:
   a Wi-Fi network;
   a Third Generation (3G) mobile network; and
   a Fourth Generation (4G) mobile network.

6. The coordinator as recited in claim 1 wherein the ZigBee protocol stack further includes a protocol layer selected from the group consisting of:
   a ZigBee network layer; and
   an application layer/APS sublayer.

7. A method of managing a ZigBee network, comprising:
   employing customer premises equipment (CPE) wide area network (WAN) management protocol (CWMP) messaging for management of a ZigBee network;

translating between the CWMP messaging and ZigBee Device Object (ZDO) messaging;
communicating the ZDO messaging over a non-ZigBee interface; and
transceiving the ZDO messaging over a ZigBee interface for management of the ZigBee network.

8. The method as recited in claim 7 wherein employing the CWMP messaging includes sending and receiving the CWMP messaging between an auto configuration server (ACS) and a CPE proxy.

9. The method as recited in claim 7 wherein translating between the CWMP messaging and the ZDO messaging includes providing the translation in a CPE proxy and basing the translation on a ZigBee data model.

10. The method as recited in claim 7 wherein communicating the ZDO messaging includes selecting the non-ZigBee interface from the wireline group consisting of:
a USB structure;
an Ethernet structure;
an RS232 structure; and
a Power Line Communication structure.

11. The method as recited in claim 7 wherein communicating the ZDO messaging includes selecting the non-ZigBee interface from the wireless group consisting of:
a Wi-Fi network;
a Third Generation (3G) mobile network; and
a Fourth Generation (4G) mobile network.

12. The method as recited in claim 7 wherein communicating the ZDO messaging includes employing a non-ZigBee physical layer in a hybrid ZigBee coordinator.

13. The method as recited in claim 7 wherein transceiving the ZDO messaging includes employing a ZigBee physical layer in a hybrid ZigBee coordinator.

14. A ZigBee management system, comprising:
an auto configuration server (ACS) that manages customer premises equipment (CPE) through CPE wide area network (WAN) management protocol (CWMP) messaging;
a CPE proxy that is coupled to the ACS to provide a protocol translation between the CWMP messaging and ZigBee device object (ZDO) messaging for a ZigBee device; and
a hybrid ZigBee coordinator that is coupled to the CPE proxy, including:
a ZigBee protocol stack that has a ZigBee MAC layer as an initial layer,
a non-ZigBee physical layer that is coupled to the ZigBee protocol stack and communicates the ZDO messaging over a non-standard ZigBee interface with the CPE proxy, and
a ZigBee physical layer that is coupled to the ZigBee protocol stack and the non-ZigBee physical layer and transceives the ZDO messaging for the ZigBee device over a standard ZigBee interface.

15. The system as recited in claim 14 wherein the protocol translation is based on a ZigBee data model.

16. The system as recited in claim 14 wherein the ZDO messaging is encapsulated in a wireline carrier or a non-ZigBee wireless carrier of the non-standard ZigBee interface.

17. The system as recited in claim 14 wherein the non-standard ZigBee interface includes a wireline connection selected from the group consisting of:
a USB structure;
an Ethernet structure;
an RS232 structure; and
a Power Line Communication structure.

18. The system as recited in claim 14 wherein the non-standard ZigBee interface includes a non-ZigBee wireless connection selected from the group consisting of:
a Wi-Fi network;
a Third Generation (3G) mobile network; and
a Fourth Generation (4G) mobile network.

19. The system as recited in claim 14 wherein the hybrid ZigBee coordinator is part of a ZigBee network selected from the group consisting of:
a ZigBee star network;
a ZigBee mesh network; and
a ZigBee tree network.

20. The system as recited in claim 14 wherein the ZigBee device is selected from the group consisting of:
a ZigBee end device;
a ZigBee router; and
a ZigBee coordinator.

* * * * *